(12) United States Patent
LaBarbera et al.

(10) Patent No.: US 9,927,050 B2
(45) Date of Patent: Mar. 27, 2018

(54) ADAPTIVE SUSPENSION FOR ROTARY CLEANING MACHINE

(71) Applicants: John LaBarbera, Poway, CA (US); Vincent LaBarbera, Poway, CA (US)

(72) Inventors: John LaBarbera, Poway, CA (US); Vincent LaBarbera, Poway, CA (US)

(73) Assignee: MYTEE PRODUCTS INC., Poway, CA (US)

( * ) Notice: Subject to any disclaimer, the term of this patent is extended or adjusted under 35 U.S.C. 154(b) by 1004 days.

(21) Appl. No.: 14/242,720

(22) Filed: Apr. 1, 2014

(65) Prior Publication Data
US 2015/0272415 A1    Oct. 1, 2015

(51) Int. Cl.
A47L 11/30    (2006.01)
A47L 11/40    (2006.01)
F16L 3/16    (2006.01)

(52) U.S. Cl.
CPC .............. *F16L 3/16* (2013.01); *A47L 11/4044* (2013.01); *A47L 11/4058* (2013.01); *A47L 11/4052* (2013.01)

(58) Field of Classification Search
CPC ............. A47L 11/4055; A47L 11/4044; A47L 11/4036
See application file for complete search history.

(56) References Cited

U.S. PATENT DOCUMENTS

| 933,003 | A | | 8/1909 | Smith | |
|---|---|---|---|---|---|
| 3,619,848 | A | | 11/1971 | Salzmann | |
| 3,624,668 | A | | 11/1971 | Krause | |
| 4,000,538 | A | | 1/1977 | Tissier | |
| 4,264,999 | A | | 5/1981 | Monson | |
| 4,339,840 | A | | 7/1982 | Monson | |
| 4,441,229 | A | | 4/1984 | Monson | |
| 5,603,599 | A | * | 2/1997 | Wesslen | B65B 43/185 294/64.2 |
| 5,706,549 | A | * | 1/1998 | Legatt | A47L 11/305 15/245 |
| 6,243,914 | B1 | * | 6/2001 | Studebaker | A47L 11/34 15/320 |
| 6,266,892 | B1 | | 7/2001 | Haynie | |
| 6,298,577 | B1 | | 10/2001 | Haynie | |
| 8,453,293 | B1 | * | 6/2013 | Monson | A47L 11/292 15/320 |
| 8,661,612 | B2 | * | 3/2014 | Brunnstrom | A47L 11/302 15/322 |
| 9,402,523 | B2 | * | 8/2016 | Studebaker | A47L 11/161 |

(Continued)

*Primary Examiner* — Michael Jennings
(74) *Attorney, Agent, or Firm* — Themis Law

(57) ABSTRACT

An adaptive suspension for a rotary cleaning machine includes a hub ring configured to receive a hub member, a plurality of rigid arms that extend radially from the hub ring and each have a proximal end rotatably connected to the hub ring and a distal end configured to be rotatably connected to a suction shoe, and a plurality of flexing arms that extend radially from the hub ring and each have a proximal end rotatably connected to the hub ring at substantially the same angular position as a rigid arm and a distal end connected to the same rigid arm at a radial distance from the proximal end of the rigid arm. The adaptive suspension adapted for use in a rotary cleaning machine and enables independent upward and downward movements of the suction shoes over an uneven surface.

10 Claims, 6 Drawing Sheets

(56) References Cited

U.S. PATENT DOCUMENTS

| | | | |
|---|---|---|---|
| 2006/0064844 A1* | 3/2006 | Venard | A47L 11/4061 15/340.3 |
| 2007/0251047 A1* | 11/2007 | Monson | A47L 11/03 15/322 |
| 2008/0141483 A1* | 6/2008 | Pearlstein | A47L 11/4038 15/320 |
| 2012/0023698 A1* | 2/2012 | Durrant | A47L 11/34 15/319 |
| 2012/0233804 A1* | 9/2012 | Studebaker | A47L 11/161 15/322 |

* cited by examiner

US 9,927,050 B2

ADAPTIVE SUSPENSION FOR ROTARY CLEANING MACHINE

FIELD OF THE INVENTION

The present invention concerns an adaptive suspension for a rotary cleaning machine, and a rotary cleaning machine that includes the adaptive suspension. More particularly, the present invention concerns an adaptive suspension for a rotary cleaning machine, which enables an independent upward and downward movement of the suction shoes of the machine.

BACKGROUND OF THE INVENTION

Cleaning machines that operate by applying vacuum to a surface to be cleaned have long been known. An example can be found in U.S. Pat. No. 933,003 to Smith. The surface to be cleaned may be a carpeted surface or a hard surface such as hardwood or tile.

Surface cleaning machines that include a plurality of rotating suction inlets are also known. These types of machines generally include a rotating disk with suction inlets, which apply vacuum on an underlying surface through appropriately shaped openings such as round holes, slots, or combinations thereof. A cleaning liquid may be pre-applied to the surface before vacuuming or be sprayed by the cleaning machine, and the rotating suction inlets remove the used cleaning liquid and dirt particles through the combination of suction and scrubbing provided by the rotating disk. Examples of these types of machines can be found in U.S. Pat. No. 3,624,668 to Krause and U.S. Pat. Nos. 4,264,999, 4,339,840 and 8,453,293 to Monson.

One drawback of rotary cleaning machines in the prior art is that they provide for an inefficient cleaning of irregular surfaces. For example, a floor may not be perfectly flat but may have high and low points, such as ridges or channels. In those instances, the suction inlets may be lifted upward when the rotating disk encounters a high point and roll over at least a portion of that high point, failing to retain contact with the floor in the area surrounding the high point. Conversely, the rotating disk may bridge over a low point and the suction inlets may fail to penetrate therein. In either case, the cleaning efficiencies of such prior art machines are low when irregularities are present in the surface to be cleaned.

U.S. Pat. No. 4,441,229 to Monson attempts to solve the problem of cleaning irregular surfaces by disclosing a rotary cleaning machine, in which a hub member is longitudinally coupled to a star-shaped structure. Suction shoes are attached to the arms of the star-shaped structure and can move upward and downward due to the flexing of those arms.

A drawback of this solution is that the arms of the star-shaped structure may move upward and downward only to a limited degree, because those arms must have a sufficient thickness to support the weight of the machine at the suction shoes and maintain a positive pressure on the suction shoes.

Another drawback of this solution is that the star-shaped structure is generally made of metal and, therefore, is prone to fatigue, especially at the junction points where the arms of the star-shaped structure meet the central hub.

U.S. patent application publication No. 2012/0233804 to Studebaker et al. also attempts to solve the problem of cleaning irregular surfaces by disclosing a rotary cleaning machine, in which suction shoes protrude from a rotary disk. Resilient biasing means, such as closed foam rubber cushions, are positioned between the rears of the suction shoes and the rotary disk, enabling the suction shoes to float individually relative to the rotary disk.

Even in this case, however, the suction shoes can have only limited upward and downward mobility due to constraints in the possible thickness and density of the rubber cushions.

SUMMARY OF THE INVENTION

In one aspect, the present invention overcomes the drawbacks of the prior art by providing an adaptive suspension for a rotary cleaning machine, which enables a greater degree of independent upward and downward movement of the suction shoes than systems in the prior art while the suction shoes continue to retain a positive pressure of against the surface to be cleaned.

An adaptive suspension according to the invention includes a hub ring configured to receive a hub member, a plurality of rigid arms radially extending from the hub ring, which rotatably connect the hub ring to the suction shoes, and a plurality of flexing arms also radially extending from the hub ring, which rotatably connect the hub ring to the rigid arms.

In one embodiment, the hub ring has an inwardly directed flange configured to support a hub member. A drive shaft is engaged into the hub member and provides a rotating motion thereto, which causes the suction shoes to move in a circular pattern. The hub member also and distributes a cleaning fluid to spraying nozzles extending from it and collects the used cleaning fluid received from the suction shoes.

In one embodiment, a plurality of recesses are defined in the lateral wall of the hub ring and are shaped to provide for the passage of conduits that convey the used cleaning fluid from the suction shoes to the hub member.

The rigid arms extending from the hub ring may be X-shaped and have apertures running through the four ends of the X shape, in order to house two pivots that enable the upward and downward rotation of the rigid arms at their proximal and distal ends and, consequently, the upward and downward rotation of the suction shoes in relation to the hub ring.

In one embodiment, the X-shaped rigid arms are formed by a plurality of outwardly convex segments that are joined at a crossover point.

The flexing arms also extend from the hub ring and include an inner and an outer member that are rotatably connected to one another at an intermediate junction point, for example, by a pivot disposed at the intermediate junction point.

In one embodiment, the inner and the outer member are radially aligned and a biasing member, such as a coil spring disposed around the inner member, acts synergistically with the inner member to maintain pressure on the intermediate junction point.

The proximal end of the flexing arm is rotatably connected to the hub ring, for example with a pivot, and the distal end of the flexing arm may be fixedly connected to an adjacent rigid member. In one embodiment, the distal end of the flexing arm is affixed to the lower surface of a X-shaped rigid arm, at the crossover point of the X shape.

In one embodiment, the inner and the outer member of the flexing arm are dimensioned to cause the inner member to have its proximal end disposed above the rigid arm and its distal end disposed below the rigid arm, thereby causing the intermediate junction point to be also disposed below the rigid arm. For example, when the rigid arm is X-shaped, the inner member of the flexing arm may be coupled to the hub ring at a point that is higher than the rigid arm and extend between the proximal segments of the X shape to reach the intermediate junction point below the rigid arm. The outer member of the flexing arm instead is entirely disposed below the rigid arm and extends from the intermediate junction point to the lower surface of the cross-over point of the rigid arm.

In one embodiment, the outer member of the flexing arm is J-shaped with an innermost portion that is straight and an outermost portion that is upwardly concave.

In one embodiment, the hub ring has a plurality of brackets affixed thereto, to which the rigid arms and the flexing arms are rotatably coupled, rather than being coupled directly to the outer surface of the hub ring.

The invention also concerns a rotary cleaning machine having an adaptive suspension according to the invention.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION OF EMBODIMENTS OF THE INVENTION

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Figure 1:
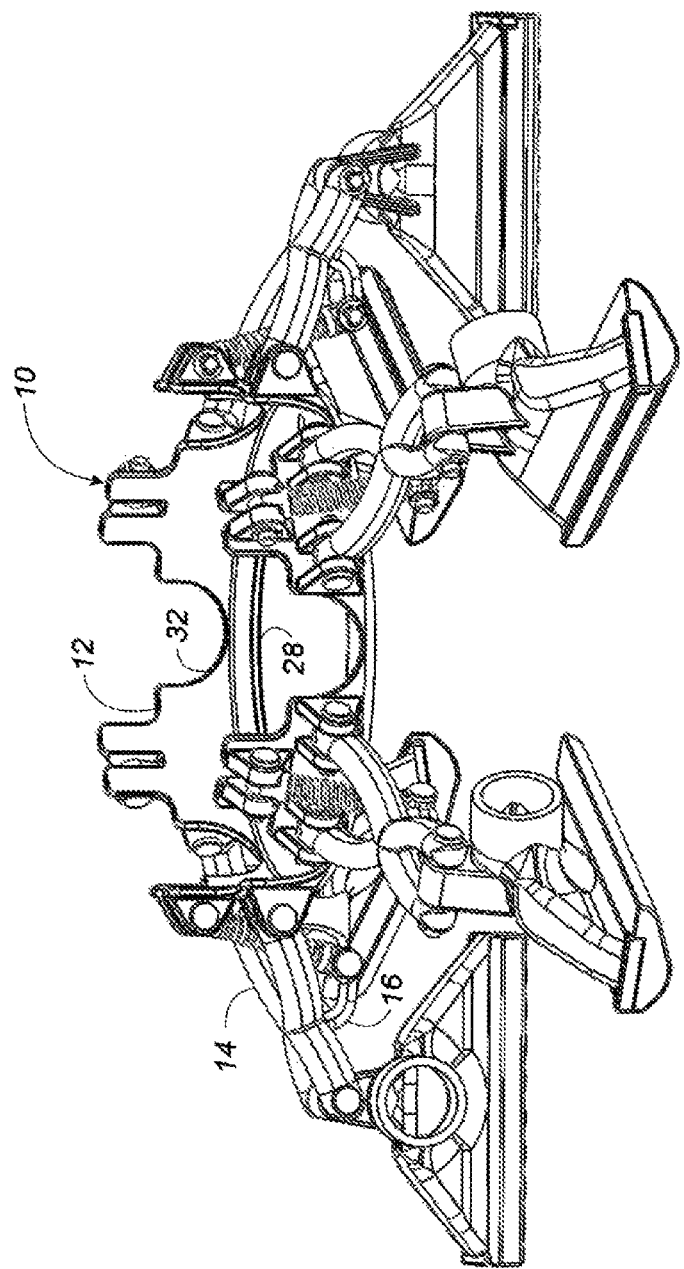
FIG. 1 illustrates a top perspective view of an adaptive suspension for a rotary cleaning machine according to the invention.

Turning first to FIG. 1, an adaptive suspension 10 for a rotary cleaning machine according to the invention includes a hub ring 12, from which a plurality of rigid arms 14 and a plurality of flexing arms 16 extend. While hub ring 12 is depicted in FIG. 1 as having a cylindrical outer surface, the term "ring" is not meant to limit the invention to cylindrical structures only and in different embodiments of the invention hub ring 12 may have different configurations. For example, hub ring 12 may have a polygonal structure with four or six walls.

Figure 2:
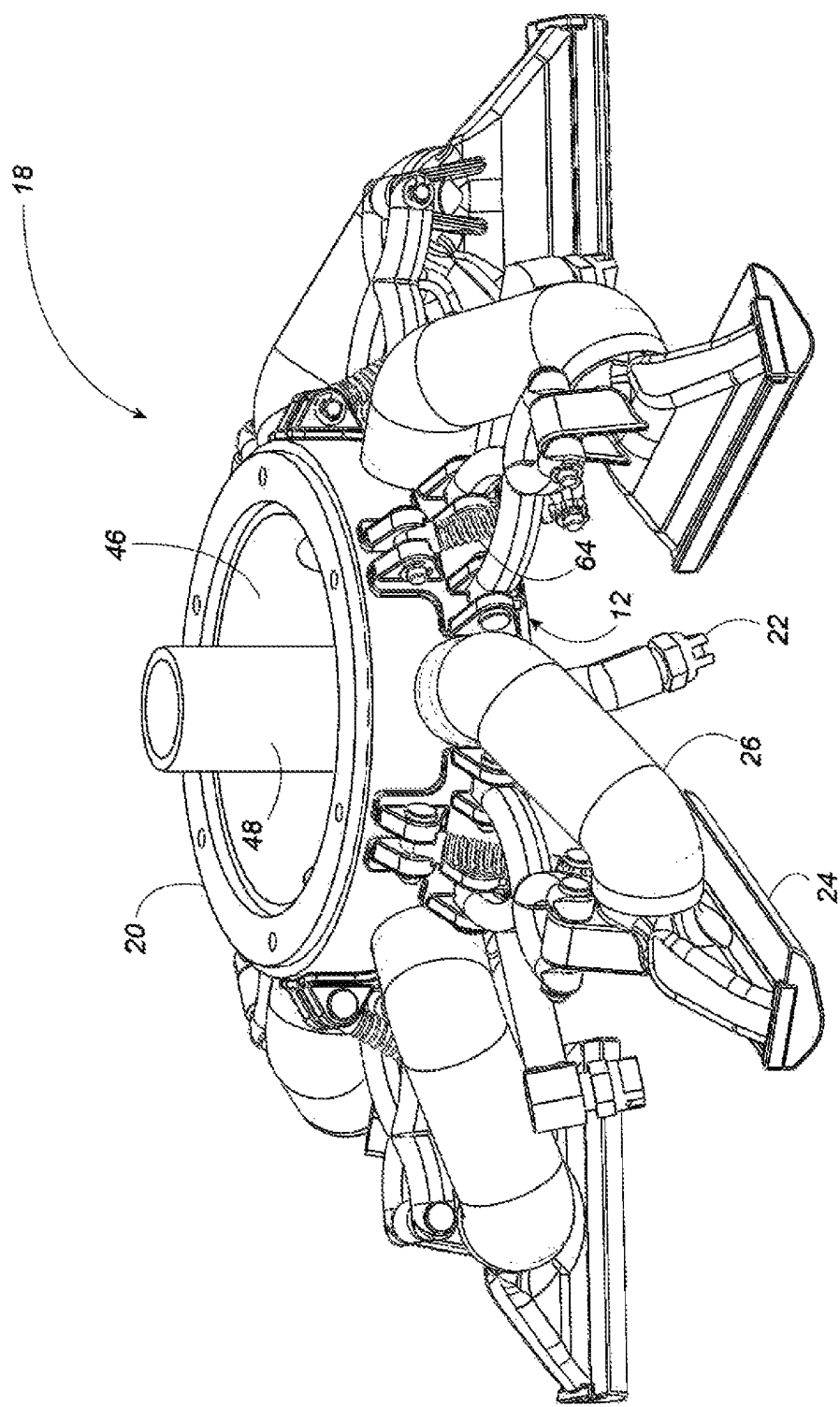
FIG. 2 illustrates a perspective view of a rotary cleaning head, which includes the adaptive suspension of FIG. 1.

Turning now to FIG. 2, a rotary cleaning head 18 for a rotary cleaning machine according to the invention includes a hub member 20, which receives torsional power from a drive shaft (not shown), and which further distributes a cleaning fluid to nozzles 22 for dispersion on a surface to be cleaned and receives the used cleaning fluid and any dirt collected therewith through suction shoes 24.

Conduits 26 fluidly connect hub member 20 with suction shoes 24, receiving the used cleaning fluid from suction shoes 24 and depositing the used cleaning fluid into a chamber 46 of hub member 20. Chamber 46 has a base defined by the base of hub member 20 and lateral walls defined respectively by the inner wall of hub member 20 and by support 48 extending from the base of hub member 20. Cleaning head 18 rotates during operation due to the rotational motion imparted by the drive shaft engaged in support 48.

Figure 3:
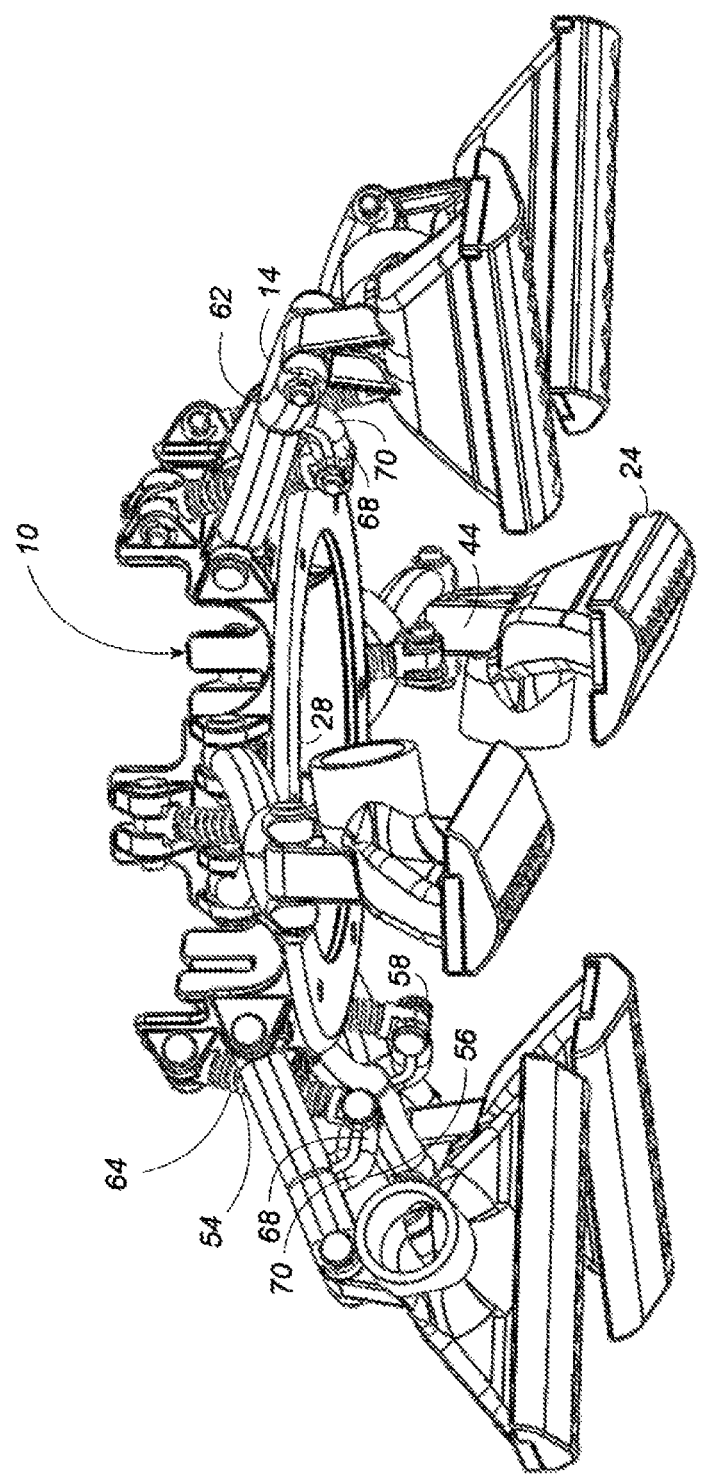
FIG. 3 illustrates a bottom perspective view of the adaptive suspension of FIG. 1.
Figure 4:
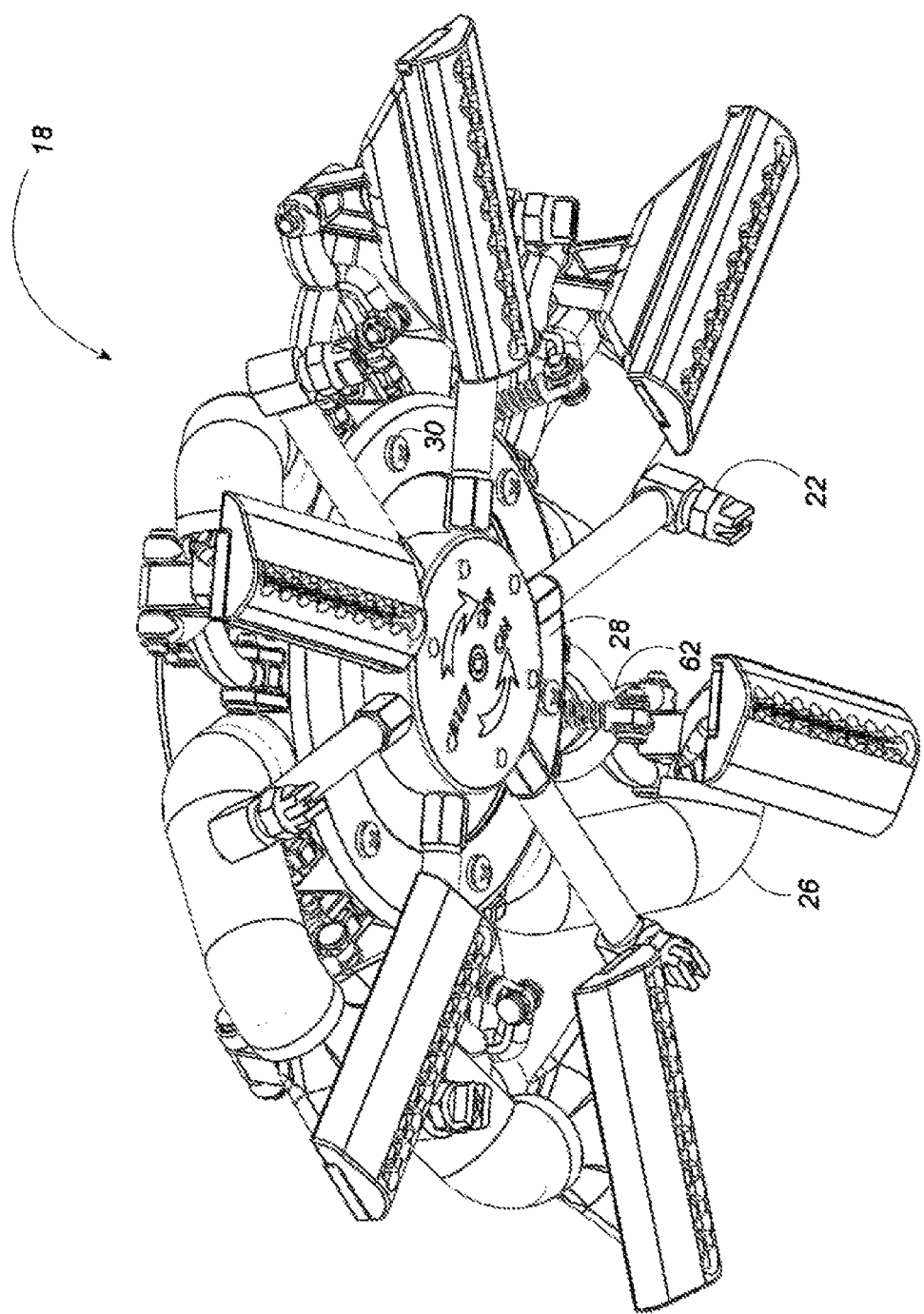
FIG. 4 illustrates a bottom perspective view of the rotary cleaning head of FIG. 2.

Hub ring 12 supports and houses hub member 20. In particular, as shown in FIGS. 1, 3 and 4, hub ring 12 includes a flange 28, which extends inwardly from the outer wall of hub ring 12 at a bottom thereof and which provides a support for hub member 20. In turn, hub member 20 may be fastened to flange 28 with one of the many fastening systems known to a person of skill in the art. In the illustrated embodiment, hub member 20 is fastened to hub ring 12 with a plurality of screws 30.

Hub ring 12 also has a number of recesses 32 defined on its outer wall, which are shaped to receive and support conduits 26 and which are disposed between adjacent pairs of rigid arms 12 and flexing arms 16.

Rigid arms 14 and flexing arms 16 extend from hub ring 12 in radial directions and are rotatably coupled thereto.

Figure 2A:
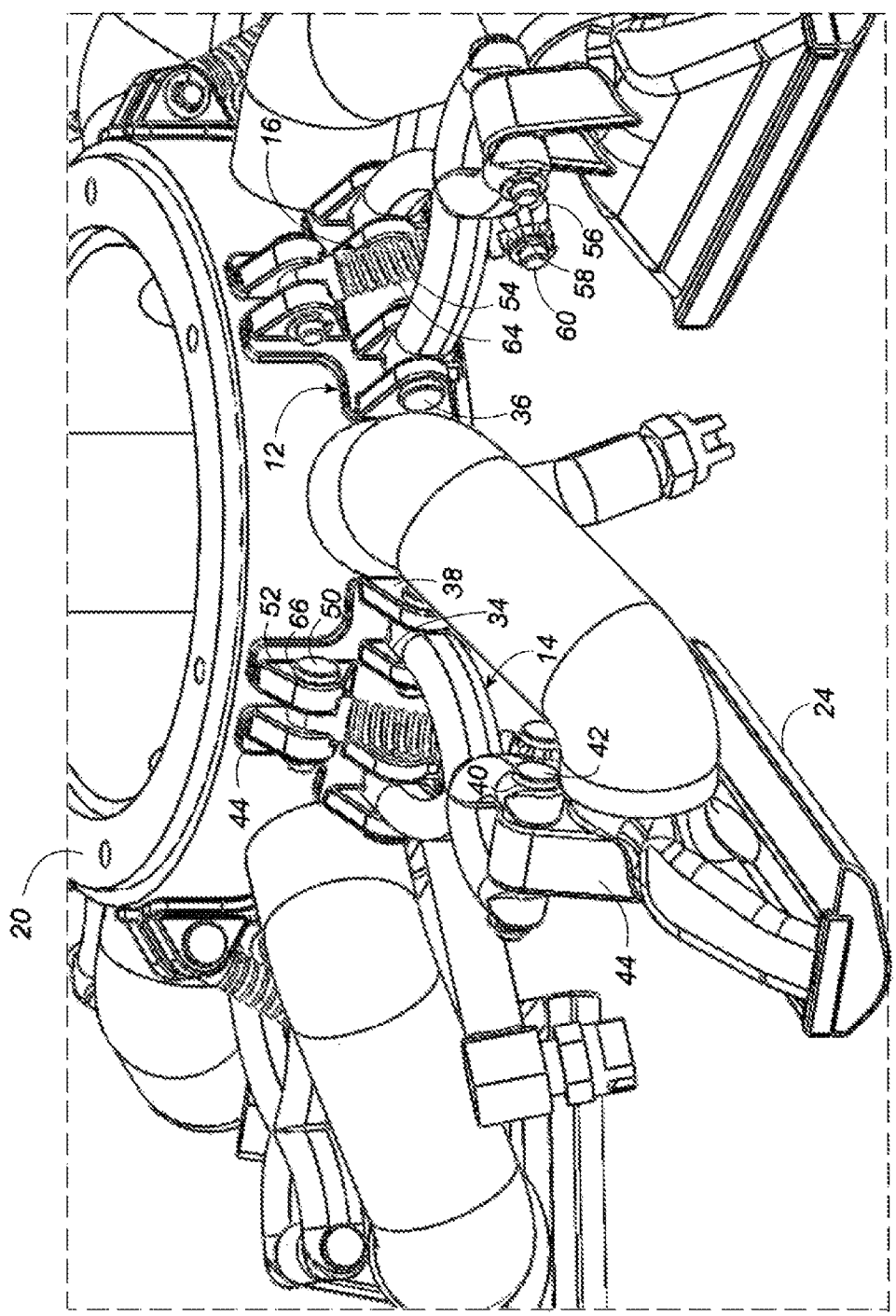
FIG. 2A illustrates a detail view of the rotary cleaning head of FIG. 2.

In particular, as visible more clearly from the detail view of FIG. 2A, each rigid arm 14 has apertures 34 at its proximal end, defined along an axis that is essentially perpendicular to a longitudinal axis of hub ring 12. A bracket 38 is affixed to hub ring 12 and has apertures 66 also defined along an axis that is essentially perpendicular to a longitudinal axis of hub ring 12. A pivot 36 is disposed in a substantially horizontal position across apertures 34 in rigid arm 14 and apertures 66 in bracket 38, enabling an upward and downward rotation of rigid arm 14 in relation to hub ring 12.

Each rigid arm 14 is also rotatably connected to a suction shoe 24. In the illustrated embodiment, the distal end of rigid arm 14 has apertures 40, which receive a second pivot 42 disposed in a substantially horizontal position within apertures 40 and across a bracket 44 attached to suction shoe 24. This arrangement provides for rigid arm 14 to enable an upward and downward rotation of shoe 24 in relation to hub ring 12 due to the rotations enabled by pivots 36 and 42.

In the illustrated embodiment, rigid arms 14 have an X shape defined by four segments that are outwardly convex and meet at a crossover point 62. Apertures 34 are defined in the two proximal segments of the X shape while apertures 40 are defined in the two distal segments of the same X shape.

Further, in the illustrated embodiment, the proximal segments of rigid arms 14 are longer than the distal segments, for reasons that will become apparent later.

Flexing arms 16 also extend from hub ring 12 in a radial direction. Each of rigid arms 16 has a proximal end that is rotatably coupled to hub ring 12 and a distal end that is rotatably coupled to a rigid arm 14 at a predetermined distance from hub ring 12.

In the illustrated embodiment, rigid arms 14 and flexing arms 16 are disposed at substantially the same angular position in relation to hub ring 12, that is, pairs of one rigid arm 14 and one flexing arm 16 are substantially aligned within a plane that includes the longitudinal axis of hub ring 12.

More particularly, each of flexing arms 16 has an inner member 54 that is pivotally coupled to hub ring 12, and an outer member 56 that is fixedly coupled to rigid arm 14. Inner member 54 and outer member 58 are rotatably coupled to one another at an intermediate junction point 58, for example, by having a pivot 60 engage opposing ends of inner member 54 and outer member 56.

The proximal end of flexing arm 16 may be rotatably coupled to bracket 44 with a pivot 50. In the illustrated embodiment, the proximal end of inner member 54 is disposed between two parallel wings 52 of bracket 44 and is rotatably coupled to parallel wings 52 by pivot 50.

It should be noted that in the illustrated embodiment the proximal end of flexing arm 16 is coupled to hub ring 12 above the proximal end of rigid arm 14, while the distal end of flexing arm 16 is coupled to rigid arm 14 at a point on the lower surface thereof.

To achieve this configuration, intermediate junction point 58 is disposed below rigid arm 14 by having inner arm 54 extends downward from its proximal end above rigid arm 14 through the proximal segments of rigid arm 14, which are of sufficient lengths of accommodate the passage of inner arm 54 therebetween.

Outer member 56 is rotatably coupled at one end to inner member 54 and is fixedly coupled at the other end to rigid arm 14 by attaching to a lower surface thereof. In the illustrated embodiment, outer member 56 is attached to rigid arm 14 at crossover point 62, but it may attached at various other points along the length of rigid arm 14.

Inner member 54 and outer member 56 of flexing arm 16 may have different shapes. In the illustrated embodiment, inner member 54 is essentially rectilinear, and outer member 56 is J-shaped, with a rectilinear portion 68 connected to intermediate junction point 58 and a curved, upwardly concave outermost portion 70 that extends from the rectilinear portion 68 and connects to crossover point 62.

Further, in the illustrated embodiment inner member 54 and outer member 56 are radially aligned, but in different embodiments inner member 54 and out member 56 may be radially misaligned, for example, inner member 54 may have an L shape, with the longer and shorter portions of the L shape disposed in substantially horizontal positions and with the longer portion of the L disposed at a different angular position than outer member 56.

A biasing member, such as a coil spring 64, is wrapped around inner member 54 and keeps intermediate junction point 58 pushed downward. Coil spring 64 causes suction shoe 24 to remain in firm contact with the surface to be cleaned even when high or low points are encountered. Without spring coil 64, a high point in the cleaning surface would likely cause suction shoe 24 to be thrust upward, becoming detached from the underlying surface and losing effectiveness in cleaning action, and a cavity in the cleaning surface may be skipped over rather than penetrated by suction shoe 24.

A person of skill in the art will appreciate that the combination of inner member 54 and coil spring 64 may be replaced by equivalent solutions, which are to be considered part of the present invention. For example, that combination may be replaced by a single flexible member, which is of straight shape when rotary cleaning head 18 is disposed on a flat surface, and which flexibly bends when a high or low point is met, providing a downward pressure on rigid arm 14 and suction shoe 24 as the flexible member attempts to return to its straight configuration.

It is now clear that by providing an adaptive suspension having the hub ring—rigid arm—flexing arm arrangement described herein, each one of suction shoes 24 can independently translate upward and downward, for example, when a protrusion or a recess are encountered in a surface to be cleaned. The degree of vertical displacement of shoes 24 can be tailored as desired by providing rigid arms 14 that are of predetermined lengths and biasing members 64 that provide predetermined amounts of pressure on flexing arms 16.

Figure 5:
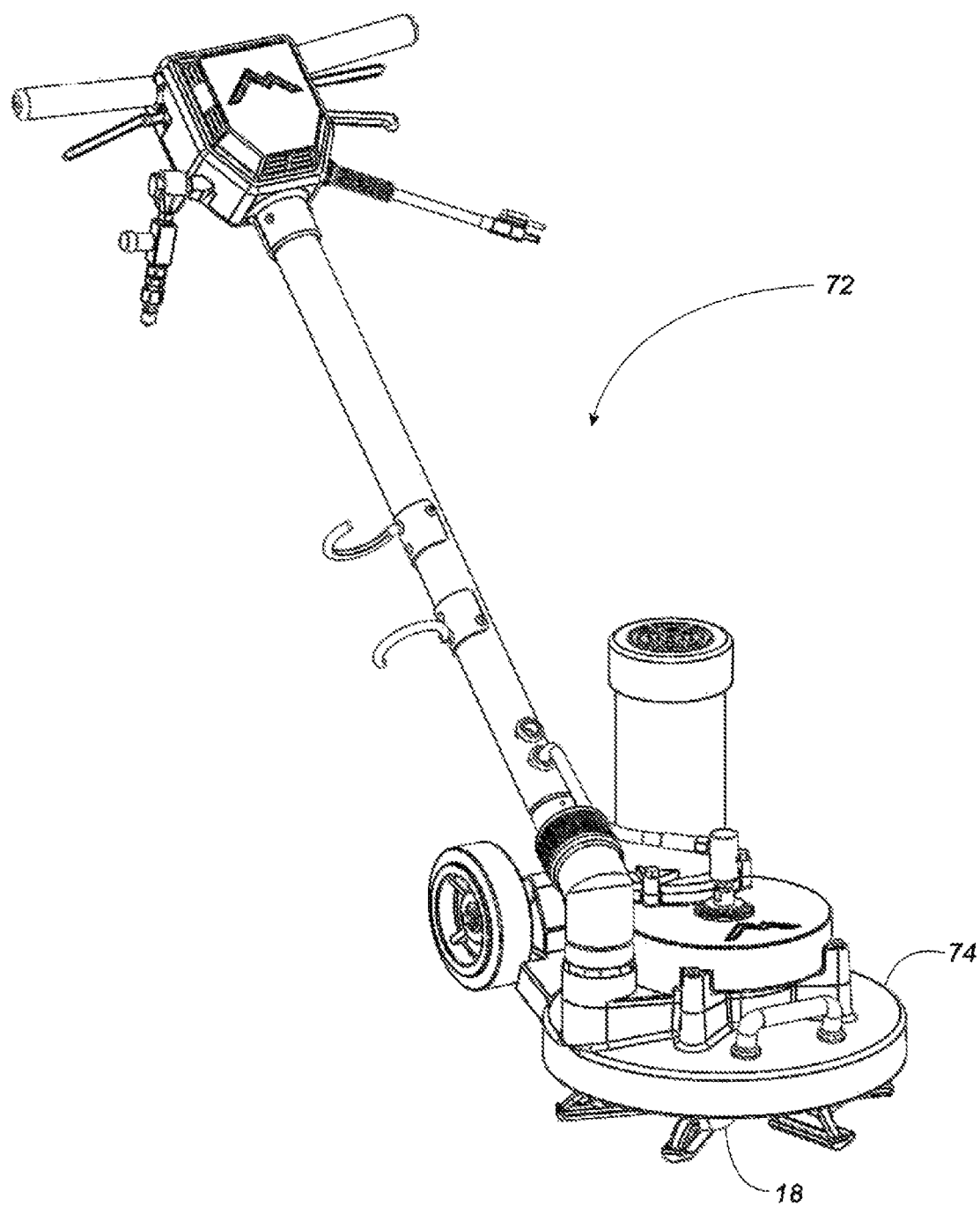
FIG. 5 illustrates a rotary cleaning machine, which includes the head of FIGS. 2 and 4.

It is now also clear that the configuration of an adaptive suspension according to the invention makes it suitable for use in rotary cleaning machines. FIG. 5 illustrates one such machine, in which a rotary cleaning head 18 that includes an adaptive suspension according to the invention is fitted in the lower portion 74 of a rotary cleaning machine 72.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become apparent to those skilled in the art and the scope of the present invention is limited only by the appended claims.

The invention claimed is:

1. A rotary cleaning machine comprising a rotating cleaning head, the rotating cleaning head comprising:
    a hub member having a base, an outer peripheral wall defining a chamber therein, and a support extending upwardly from the base and configured to receive a drive shaft;
    a plurality of nozzles configured to spray a cleaning fluid, the plurality of nozzles extending from a lower side of the base of the hub;
    a plurality of suction shoes configured to aspire the cleaning fluid from a surface to be treated;
    a plurality of conduits fluidly connecting the suction shoes with the hub member; and
    an adaptive suspension comprising,
    a hub ring supporting the hub member,
    a plurality of rigid arms radially extending from the hub ring, each of the rigid arms having a proximal end that is rotatably connected to the hub ring and a distal end that is rotatably connected to a suction shoe; and
    a plurality of flexing arms radially extending from the hub ring, each of the flexing arms having a proximal end that is rotatably connected to the hub ring at a substantially same angular position as one of the rigid arms and a distal end that is connected to the one of the rigid arms at a radial distance from the proximal end of the one of the rigid arms,
    whereby the adaptive suspension enables independent upward and downward movements of the suction shoes over uneven portions of the surface to be treated.

2. The rotary cleaning machine according to claim 1, wherein the hub ring comprises an inwardly directed flange that supports the hub member and a plurality of recesses that are defined between pairs of the rigid arms and that receive the conduits.

3. The rotary cleaning machine according to claim 1, wherein a rigid arm selected from the plurality of rigid arms is X-shaped and has apertures that are defined at the proximal and distal ends thereof and that each receive a pivot.

4. The rotary cleaning machine according to claim 3, wherein the X-shaped rigid arm comprises a plurality of outwardly convex segments.

5. The rotary cleaning machine according to claim 1, wherein a flexing arm selected from the plurality of flexing arms comprises an inner and an outer member that are rotatably connected to one another at an intermediate junction point, and a biasing member disposed between the proximal end and the intermediate junction point of the flexing arm.

6. The rotary cleaning machine according to claim 5, wherein the inner and the outer member are radially aligned.

7. The rotary cleaning machine according to claim 5, wherein a rigid arm selected from the plurality of rigid arms has an X shape, and wherein the distal end of the flexing arm is connected to a crossover point of the X shape.

8. The rotary cleaning machine according to claim 7, wherein the inner member of the flexing arm has a proximal end that is pivotally connected to the hub ring at a position above the proximal end of the rigid am and a distal end pivotally connected to a proximal end of the outer member at the intermediate junction point, and wherein the outer member of the flexing arm has a distal end fixedly connected below the crossover point of the X shape.

9. The rotary cleaning machine according to claim 8, wherein the inner and the outer member of the flexing arm are dimensioned to cause the inner member to have the proximal end above the rigid arm and the distal end below the rigid arm when the adaptive suspension is disposed on a flat surface, thereby causing the intermediate junction point to be disposed below the rigid arm.

10. The rotary cleaning machine according to claim 8, wherein the outer member of the flexing arm is J-shaped with an outermost portion that is upwardly concave.

* * * * *